US010204594B2

(12) United States Patent
Kim et al.

(10) Patent No.: US 10,204,594 B2
(45) Date of Patent: Feb. 12, 2019

(54) TRANSPARENT DISPLAY PANEL AND TRANSPARENT DISPLAY DEVICE INCLUDING THE SAME

(71) Applicant: Samsung Display Co., Ltd., Yongin-si, Gyeonggi-Do (KR)

(72) Inventors: Hyo-Sun Kim, Seongnam-si (KR); Jae-Joong Kwon, Suwon-si (KR); Young-Jun Seo, Seoul (KR)

(73) Assignee: Samsung Display Co., Ltd. (KR)

( * ) Notice: Subject to any disclaimer, the term of this patent is extended or adjusted under 35 U.S.C. 154(b) by 47 days.

(21) Appl. No.: 15/373,153

(22) Filed: Dec. 8, 2016

(65) Prior Publication Data

US 2017/0178595 A1 Jun. 22, 2017

(30) Foreign Application Priority Data

Dec. 17, 2015 (KR) ........................ 10-2015-0181290

(51) Int. Cl.

| | |
|---|---|
| ***G02F 1/13*** | (2006.01) |
| ***G09G 3/32*** | (2016.01) |
| ***G09G 3/36*** | (2006.01) |
| ***G09G 5/10*** | (2006.01) |
| ***G09G 3/3266*** | (2016.01) |

(Continued)

(52) U.S. Cl.

CPC ............. *G09G 5/10* (2013.01); *G09G 3/3266* (2013.01); *G09G 3/3275* (2013.01); *G09G 3/36* (2013.01); *G09G 3/3674* (2013.01); *G09G 3/3685* (2013.01); *G09G 3/38* (2013.01); *G09G 2300/023* (2013.01); *G09G 2320/066* (2013.01);

(Continued)

(58) Field of Classification Search

CPC ...... G09G 5/10; G09G 3/3266; G09G 3/3275; G09G 3/3674; G09G 3/3685; G09G 2320/066; G09G 2360/14; G09G 3/19; G02F 1/15; G02F 2201/44

See application file for complete search history.

(56) References Cited

U.S. PATENT DOCUMENTS

2005/0123265 A1* 6/2005 Kimura ............. G02F 1/133621 385/147
2010/0315408 A1* 12/2010 Kang ..................... G09G 3/342 345/214

(Continued)

FOREIGN PATENT DOCUMENTS

KR 10-1329139 B1 11/2013
KR 10-2015-0015278 A 2/2015
KR 10-2015-0054384 A 5/2015

*Primary Examiner* — Nathanael R Briggs

(74) *Attorney, Agent, or Firm* — Innovation Counsel LLP

(57) ABSTRACT

A transparent display panel includes a transparent display structure and a light transmittance adjusting structure. The transparent display structure includes a display region and a transmittance region. The light transmittance adjusting structure is located over or under the transparent display structure. The light transmittance adjusting structure includes a volume changeable material of which a volume is changed in response to intensity of incident light or a photochromic material of which a coloring degree is changed in response to the intensity of incident light. The transparent display panel effectively improves quality of an image displayed on the transparent display panel by maintaining or adjusting a contrast ratio of the image according to the intensity of the incident light.

20 Claims, 9 Drawing Sheets

(51) Int. Cl.
*G09G 3/3275* (2016.01)
*G09G 3/38* (2006.01)

(52) U.S. Cl.
CPC ... *G09G 2320/08* (2013.01); *G09G 2360/144* (2013.01); *G09G 2380/10* (2013.01)

(56) References Cited

U.S. PATENT DOCUMENTS

| | | | | |
|---|---|---|---|---|
| 2015/0036204 | A1* | 2/2015 | Branda .................... | G02B 5/23<br>359/244 |
| 2017/0174983 | A1* | 6/2017 | Odeh ....................... | C09K 9/02 |

* cited by examiner

TRANSPARENT DISPLAY PANEL AND TRANSPARENT DISPLAY DEVICE INCLUDING THE SAME

CROSS-REFERENCE TO RELATED APPLICATION(S)

This application claims priority under 35 USC § 119 to Korean Patent Applications No. 10-2015-0181290, filed on Dec. 17, 2015 in the Korean Intellectual Property Office (KIPO), the disclosure which is incorporated herein in its entirety by reference.

BACKGROUND

1. Technical Field

The present disclosure relates generally to a display device. More particularly, the present disclosure relates to a transparent display panel that can adjust light transmittance and a transparent display device including the transparent display panel.

2. Description of the Related Art

Recently, a transparent display device (e.g., a car window, a show window, a building window) that allows a viewer to watch an object behind a transparent display panel of the transparent display device as well as visual information displayed on the transparent display panel has received attention. Generally, since incident light directly affects an image displayed on the transparent display panel in the transparent display device, quality and visibility of the image may be degraded because a contrast ratio of the image is lowered as intensity of the incident light increases. Thus, to improve the quality of the image, conventional transparent display devices may maintain the contrast ratio of the image regardless of the intensity of the incident light using a liquid crystal structure located over or under the transparent display panel and by adjusting light transmittance of the liquid crystal structure according to the intensity of the incident light. However, in the conventional transparent display devices, light transmittance may be decreased by an internal structure such as a thin film transistor, a liquid crystal layer, an upper electrode, and a lower electrode of the liquid crystal structure, and the power consumption for driving the liquid crystal structure may unnecessarily increase.

SUMMARY

Some example embodiments provide a transparent display panel that can improve quality of an image displayed on the transparent display panel by adjusting light transmittance according to the intensity of the incident light without a liquid crystal structure in both an indoor environment and an outdoor environment.

Some example embodiments provide a transparent display device including the transparent display panel that can provide a user with an improved quality image regardless of intensity of incident light.

According to some example embodiments, a transparent display panel may include a transparent display structure including a display region and a transmittance region, and a light transmittance adjusting structure located over or under the transparent display structure. The light transmittance adjusting structure may include a volume changeable material of which a volume is changed in response to intensity of incident light.

In example embodiments, the volume changeable material may block a passage of the incident light through the light transmittance adjusting structure.

In example embodiments, the volume of the volume changeable material may be increased as the intensity of the incident light increases. In addition, the volume of the volume changeable material may be decreased as the intensity of the incident light decreases.

In example embodiments, the light transmittance adjusting structure may overlap the display region and the transmittance region of the transparent display structure.

In example embodiments, the light transmittance adjusting structure may overlap the transmittance region of the transparent display structure. In addition, the light transmittance adjusting structure may not overlap the display region of the transparent display structure.

In example embodiments, the transparent display panel may further include a buffer structure located near the light transmittance adjusting structure. The buffer structure may overlap the display region of the transparent display structure.

In example embodiments, the transparent display structure may include a liquid crystal display structure or an organic light emitting display structure.

According to some example embodiments, a transparent display panel may include a transparent display structure including a display region and a transmittance region, and a light transmittance adjusting structure located over or under the transparent display structure. The light transmittance adjusting structure may include a photochromic material of which light transmittance is changed in response to intensity of incident light.

In example embodiments, the light transmittance of the photochromic material may be determined according to a coloring degree of the photochromic material.

In example embodiments, the light transmittance of the photochromic material may be decreased as the intensity of the incident light increases. In addition, the light transmittance of the photochromic material may be increased as the intensity of the incident light decreases.

In example embodiments, the light transmittance adjusting structure may overlap the display region and the transmittance region of the transparent display structure.

In example embodiments, the light transmittance adjusting structure may overlap the transmittance region of the transparent display structure. In addition, the light transmittance adjusting structure may not overlap the display region of the transparent display structure.

In example embodiments, the transparent display panel may further include a buffer structure located near the light transmittance adjusting structure. The buffer structure may overlap the display region of the transparent display structure.

In example embodiments, the transparent display structure may include a liquid crystal display structure or an organic light emitting display structure.

According to some example embodiments, a transparent display device may include a transparent display panel including a transparent display structure that includes a display region and a transmittance region and a light transmittance adjusting structure that is located over or under the transparent display structure. The transparent display panel displays an image using the transparent display structure, a scan driver configured to provide a scan signal to the transparent display panel, a data driver configured to provide a data signal to the transparent display panel, and a timing controller configured to control the scan driver and the data driver. Light transmittance of the light transmittance adjusting structure may be adjusted based on changes of internal material according to intensity of incident light.

In example embodiments, the light transmittance adjusting structure may include a volume changeable material of which a volume is changed in response to the intensity of the incident light. The volume changeable material may block a passage of the incident light through the light transmittance adjusting structure.

In example embodiments, the volume of the volume changeable material may be increased as the intensity of the incident light increases. In addition, the volume of the volume changeable material may be decreased as the intensity of the incident light decreases.

In example embodiments, the light transmittance adjusting structure may include a photochromic material of which a coloring degree is changed in response to the intensity of the incident light. The light transmittance of the photochromic material may be determined according to the coloring degree of the photochromic material.

In example embodiments, the light transmittance of the photochromic material may be decreased as the intensity of the incident light increases. In addition, the light transmittance of the photochromic material may be increased as the intensity of the incident light decreases.

In example embodiments, the transparent display structure may include a liquid crystal display structure or an organic light emitting display structure.

Therefore, a transparent display panel according to example embodiments may effectively improve quality of an image displayed on the transparent display panel using a light transmittance adjusting structure located over or under a transparent display structure. The light transmittance adjusting structure includes a volume changeable material of which a volume is changed in response to the intensity of the incident light or a photochromic material of which light transmittance is changed in response to the intensity of the incident light.

In addition, a transparent display device including the transparent display panel according to example embodiments may provide a viewer with an improved quality image as intensity of incident light changes.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Hereinafter, the present disclosure will be explained in detail with reference to the accompanying drawings.

Figure 1:
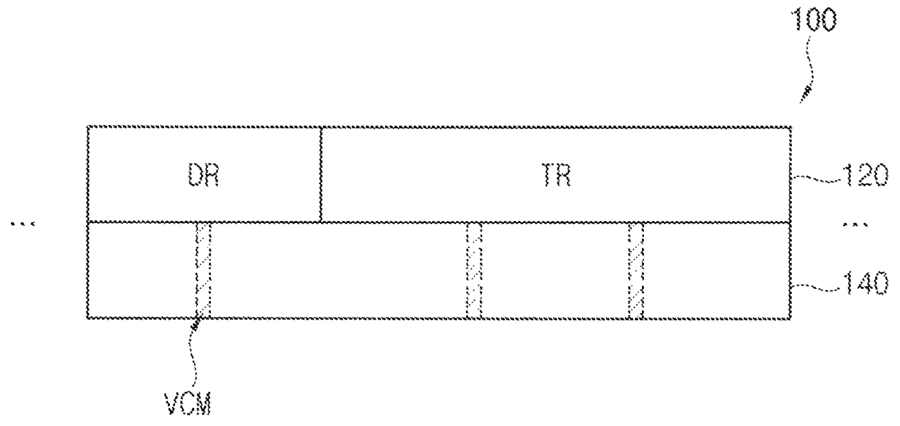
FIG. 1 is a diagram illustrating a transparent display panel, according to example embodiments.
Figure 2A:
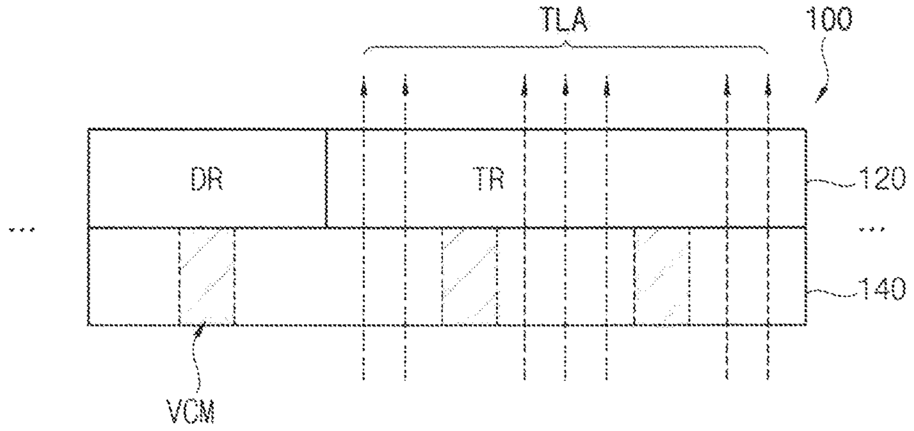
FIG. 2A is a diagram illustrating an example in which the transparent display panel of FIG. 1 adjusts light transmittance in response to incident light having relatively weak intensity.
Figure 2B:
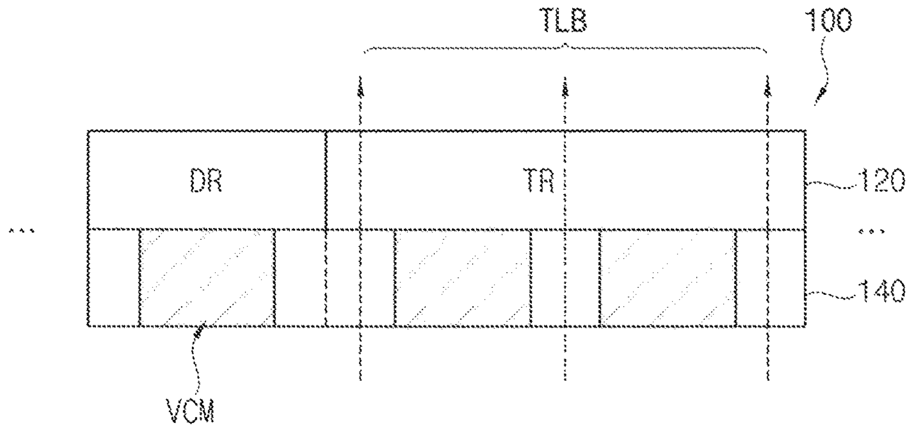
FIG. 2B is a diagram illustrating an example in which the transparent display panel of FIG. 1 adjusts light transmittance in response to incident light having relatively strong intensity.

FIG. 1 is a diagram illustrating a transparent display panel, according to example embodiments. FIG. 2A is a diagram illustrating an example in which the transparent display panel of FIG. 1 adjusts light transmittance in response to incident light having relatively weak intensity. FIG. 2B is a diagram illustrating an example in which the transparent display panel of FIG. 1 adjusts light transmittance in response to incident light having relatively strong intensity.

Referring to FIGS. 1 through 2B, the transparent display panel 100 may include a transparent display structure 120 and a light transmittance adjusting structure 140. Here, the light transmittance adjusting structure 140 may overlap a display region DR and a transmittance region TR of the transparent display structure 120. In an example embodiment, as illustrated in FIG. 1, the light transmittance adjusting structure 140 may be located under the transparent display structure 120. In another example embodiment, the light transmittance adjusting structure 140 may be located over the transparent display structure 120. Although it is illustrated in FIG. 1 that a volume changeable material VCM included in the light transmittance adjusting structure 140 is located under both the display region DR and the transmittance region TR of the transparent display structure 120, in some example embodiments, the volume changeable material VCM included in the light transmittance adjusting structure 140 may be located only under the display region DR of the transparent display structure 120 or only under the transmittance region TR of the transparent display structure 120. For example, when the volume changeable material VCM included in the light transmittance adjusting structure 140 is located only under the display region DR of the transparent display structure 120, light transmittance of the light transmittance adjusting structure 140 may be decreased as the volume changeable material VCM expands under the transmittance region TR of the transparent display structure 120 (i.e., as a volume of the volume changeable material VCM increases).

The transparent display structure 120 may include the display region DR and the transmittance region TR. In an example embodiment, the transparent display structure 120 may include a liquid crystal display structure that corresponds to at least one pixel having a liquid crystal layer and a transmittance structure that corresponds to a transmittance window. In this case, the liquid crystal display structure may be formed in the display region DR of the transparent display structure 120, and the transmittance structure may be formed in the transmittance region TR of the transparent display structure 120. In one example, the liquid crystal display structure may include at least one of a red light emitting pixel structure, a green light emitting pixel structure, and a blue light emitting pixel structure. In another example, the liquid crystal display structure may include at least one of a red light emitting pixel structure, a green light emitting pixel structure, a blue light emitting pixel structure, and a white light emitting pixel structure.

In another example embodiment, the transparent display structure 120 may include an organic light emitting display structure that corresponds to at least one pixel having an organic light emitting diode and a transmittance structure that corresponds to a transmittance window. In this case, the organic light emitting display structure may be formed in the display region DR of the transparent display structure 120, and the transmittance structure may be formed in the transmittance region TR of the transparent display structure 120. In one example, the organic light emitting display structure may include at least one of a red light emitting pixel structure, a green light emitting pixel structure, and a blue light emitting pixel structure. In another example, the organic light emitting display structure may include at least one of a red light emitting pixel structure, a green light emitting pixel structure, a blue light emitting pixel structure, and a white light emitting pixel structure. Since an image is displayed on the display region DR of the transparent display structure 120 and incident light passes through the transmittance region TR of the transparent display structure 120, a viewer can watch an object located behind the transparent display panel 100 as well as visual information (i.e., the image) displayed on the transparent display panel 100. For the convenience of description, other regions such as a wiring region of the transparent display structure 120 other than the display region DR and the transmittance region TR are not illustrated in FIG. 1.

The light transmittance adjusting structure 140 may include the volume changeable material VCM of which a volume is changed in response to the intensity of the incident light. The volume changeable material VCM may block a passage of the incident light through the light transmittance adjusting structure 140. The volume changeable material VCM may be a photoisomerization material such as polymer containing azobenzene, amorphous spirooxazine, and trans-azobenzene. However, the volume changeable material VCM is not limited thereto. The volume of the volume changeable material VCM may be increased as the intensity of the incident light increases, and/or the volume of the volume changeable material VCM may be decreased as the intensity of the incident light decreases.

As illustrated in FIG. 2A, the volume of the volume changeable material VCM may be relatively small when the intensity of the incident light is relatively weak. As a result, an amount of the incident light passing through the light transmittance adjusting structure 140 may be increased as indicated by TLA, and thus the light transmittance of the light transmittance adjusting structure 140 may be increased. On the other hand, as illustrated in FIG. 2B, the volume of the volume changeable material VCM may be relatively big when the intensity of the incident light is relatively strong. As a result, an amount of the incident light passing through the light transmittance adjusting structure 140 may be decreased as indicated by TLB, and thus the light transmittance of the light transmittance adjusting structure 140 may be decreased. Generally, it is not easy for a conventional transparent display panel to implement a black color under an environment in which the intensity of the incident light is relatively strong. Thus, under such an environment, a contrast ratio of the image displayed on the conventional transparent display panel is relatively low. However, in the transparent display panel 100, the light transmittance of the light transmittance adjusting structure 140 is decreased as the volume of the volume changeable material VCM is increased under an environment in which the intensity of the incident light is relatively strong. As a result, a contrast ratio of the image displayed on the transparent display panel 100 may be maintained at or adjusted to a proper level under such an environment in which the intensity of the incident light can vary, and thus the quality and the visibility of the image displayed on the transparent display panel 100 may be improved. Further, the light transmittance of the light transmittance adjusting structure 140 may be decreased by a similar rate in all wavelengths reducing distortion of a color of the image displayed on the transparent display panel 100 and a color of the background that a viewer watches through the transparent display panel 100. This phenomenon is herein referred to as Color-Neutral Darkening.

As described above, the transparent display panel 100 may effectively improve the quality of the image displayed on the transparent display panel 100 using the light transmittance adjusting structure 140 located over or under the transparent display structure 120. The light transmittance adjusting structure 140 includes the volume changeable material VCM of which the volume is changed in response to the intensity of the incident light. As a result, the contrast ratio of the image displayed on the transparent display panel 100 may be improved because the light transmittance of the light transmittance adjusting structure 140 is decreased as the intensity of the incident light increases. For example, the contrast ratio of the image displayed on the transparent display panel 100 may be maintained at or adjusted because the light transmittance of the light transmittance adjusting structure 140 is increased as the intensity of the incident light decreases. Thus, a transparent display device including the transparent display panel 100 may provide a user with an improved quality image according to the intensity of the incident light.

The volume changeable material VCM included in the light transmittance adjusting structure 140 may respond to visible light as well as ultraviolet light. In this case, the transparent display panel 100 may maintain or adjust the contrast ratio of the image displayed on the transparent display panel 100 according to the intensity of the incident light in both an indoor environment and an outdoor environment. Further, since the volume of the volume changeable material VCM included in the light transmittance adjusting structure 140 is naturally (or automatically) changed in response to the intensity of the incident light, the transparent display panel 100 may prevent unnecessary power consumption for driving an additional component that adjusts the light transmittance (e.g., a liquid crystal structure included in a conventional transparent display panel). In some example embodiments, the light transmittance adjusting structure 140 may be formed in a film shape or in a liquid form and may be attached (or adhered) to the transparent display structure 120. In this case, the transparent display panel 100 may be manufactured by simply attaching the light transmittance adjusting structure 140 to the transparent display structure 120 while reducing a manufacturing cost of the transparent display panel 100.

Figure 3:
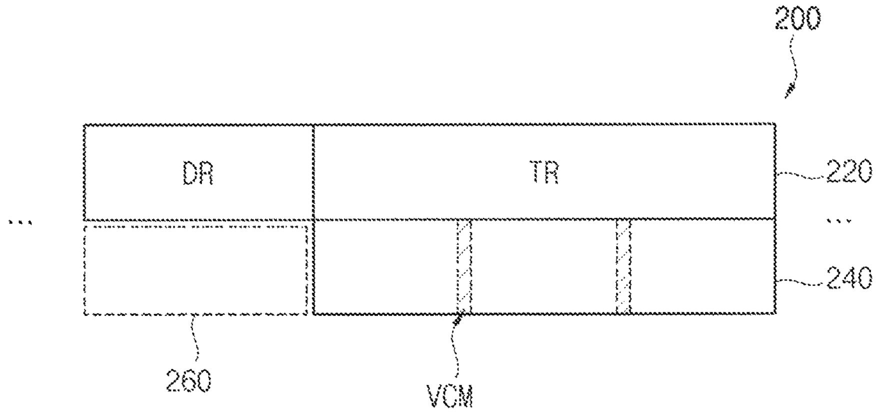
FIG. 3 is a diagram illustrating a transparent display panel, according to example embodiments.

FIG. 3 is a diagram illustrating a transparent display panel, according to example embodiments. The transparent display panel 200 may include a transparent display structure 220 and a light transmittance adjusting structure 240. The transparent display structure 220 may include a display region DR and a transmittance region TR. The light transmittance adjusting structure 240 may include a volume changeable material VCM of which a volume is changed in response to intensity of incident light. As described above, the volume changeable material VCM may block a passage of the incident light through the light transmittance adjusting structure 240. The volume changeable material VCM may be a photoisomerization material. In this example embodiment, the light transmittance adjusting structure 240 may overlap only the transmittance region TR of the transparent display structure 220, and the light transmittance adjusting structure 240 may not overlap the display region DR of the transparent display structure 220. In the transparent display panel 200, the incident light passes through the transmittance region TR of the transparent display structure 220 in which a transmittance structure corresponding to a transmittance window is formed, and the light transmittance adjusting structure 240 does not overlap the display region DR of the transparent display structure 220. A crack due to an empty space (e.g., a stair gap) may be formed by the light transmittance adjusting structure 240. In some example embodiments, the transparent display panel 200 may further include a buffer structure 260. The buffer structure 260 may be located near the light transmittance adjusting structure 240 to overlap the display region DR of the transparent display structure 220. In this case, the buffer structure 260 fills the empty space formed by the light transmittance adjusting structure 240 preventing a crack that may be formed due to the empty space formed by the light transmittance adjusting structure 240. In an example embodiment, as illustrated in FIG. 3, the light transmittance adjusting structure 240 may be located under the transparent display structure 220. In another example embodiment, the light transmittance adjusting structure 240 may be located over the transparent display structure 220. Since the transparent display panel 200 of FIG. 3 is substantially the same as the transparent display panel 100 of FIG. 1 except that the light transmittance adjusting structure 240 does not overlap the display region DR of the transparent display structure 220, duplicated description related thereto may be omitted.

Figure 4:
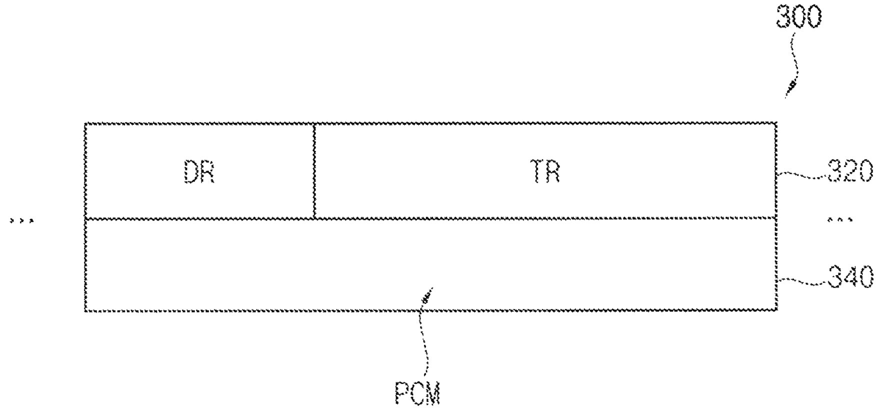
FIG. 4 is a diagram illustrating a transparent display panel, according to example embodiments.
Figure 5A:
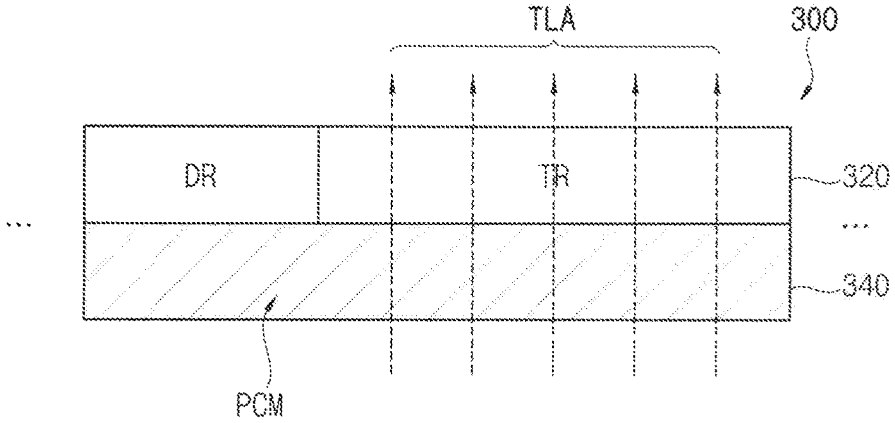
FIG. 5A is a diagram illustrating an example in which the transparent display panel of FIG. 4 adjusts light transmittance in response to incident light having relatively weak intensity.
Figure 5B:
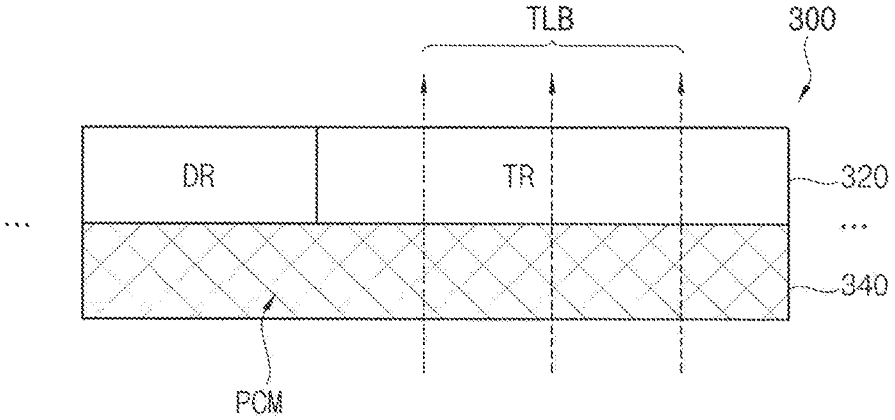
FIG. 5B is a diagram illustrating an example in which the transparent display panel of FIG. 4 adjusts light transmittance in response to incident light having relatively strong intensity.

FIG. 4 is a diagram illustrating a transparent display panel, according to example embodiments. FIG. 5A is a diagram illustrating an example in which the transparent display panel of FIG. 4 adjusts light transmittance in response to incident light having relatively weak intensity. FIG. 5B is a diagram illustrating an example in which the transparent display panel of FIG. 4 adjusts light transmittance in response to incident light having relatively strong intensity.

Referring to FIGS. 4 through 5B, the transparent display panel 300 may include a transparent display structure 320 and a light transmittance adjusting structure 340. The light transmittance adjusting structure 340 may overlap a display region DR and a transmittance region TR of the transparent display structure 320. In an example embodiment, as illustrated in FIG. 4, the light transmittance adjusting structure 340 may be located under the transparent display structure 320. In another example embodiment, the light transmittance adjusting structure 340 may be located over the transparent display structure 320.

The transparent display structure 320 may include the display region DR and the transmittance region TR. In an example embodiment, the transparent display structure 320 may include a liquid crystal display structure that corresponds to at least one pixel having a liquid crystal layer and a transmittance structure that corresponds to a transmittance window. The liquid crystal display structure may be formed in the display region DR of the transparent display structure 320, and the transmittance structure may be formed in the transmittance region TR of the transparent display structure 320. In one example, the liquid crystal display structure may include at least one of a red light emitting pixel structure, a green light emitting pixel structure, and a blue light emitting pixel structure. In another example, the liquid crystal display structure may include at least one of a red light emitting pixel structure, a green light emitting pixel structure, a blue light emitting pixel structure, and a white light emitting pixel structure.

In another example embodiment, the transparent display structure 320 may include an organic light emitting display structure that corresponds to at least one pixel having an organic light emitting diode and a transmittance structure that corresponds to a transmittance window. In this case, the organic light emitting display structure may be formed in the display region DR of the transparent display structure 320, and the transmittance structure may be formed in the transmittance region TR of the transparent display structure 320. In one example, the organic light emitting display structure may include at least one of a red light emitting pixel structure, a green light emitting pixel structure, and a blue light emitting pixel structure. In another example, the organic light emitting display structure may include at least one of a red light emitting pixel structure, a green light emitting pixel structure, a blue light emitting pixel structure, and a white light emitting pixel structure. Since an image is displayed on the display region DR of the transparent display structure 320 and incident light passes through the transmittance region TR of the transparent display structure 320, a viewer can watch an object located behind the transparent display panel 300 as well as visual information (i.e., the image) displayed on the transparent display panel 300. For the convenience of description, other regions such as a wiring region of the transparent display structure 320 other than the display region DR and the transmittance region TR are not illustrated in FIG. 4.

The light transmittance adjusting structure 340 may include a photochromic material PCM of which light transmittance is changed in response to the intensity of the incident light. The light transmittance of the photochromic material PCM may be determined according to a coloring degree of the photochromic material PCM. For example, when the photochromic material PCM becomes colored in response to the intensity of the incident light, the light transmittance of the photochromic material PCM may be decreased. In addition, when the photochromic material PCM becomes transparent in response to the intensity of the incident light, the light transmittance of the photochromic material PCM may be increased. Specifically, the light transmittance of the photochromic material PCM may be decreased as the intensity of the incident light increases. In addition, the light transmittance of the photochromic material PCM may be increased as the intensity of the incident light decreases. As illustrated in FIG. 5A, the light transmittance of the photochromic material PCM may be increased because the photochromic material PCM may become transparent as the intensity of the incident light is decreased. As a result, an amount of the incident light passing through the light transmittance adjusting structure 340 may be increased as indicated by TLA, and thus the light transmittance of the light transmittance adjusting structure 340 may be increased. On the other hand, as illustrated in FIG. 5B, the light transmittance of the photochromic material PCM may be decreased because the photochromic material PCM may become colored as the intensity of the incident light is stronger. As a result, an amount of the incident light passing through the light transmittance adjusting structure 340 may be decreased as indicated by TLB, and thus the light transmittance of the light transmittance adjusting structure 340 may be decreased. Generally, it is not easy for a conventional transparent display panel to implement a black color under an environment in which the intensity of the incident light is relatively strong. Thus, under such an environment, a contrast ratio of the image displayed on the conventional transparent display panel is relatively low. However, in the transparent display panel 300, the light transmittance of the light transmittance adjusting structure 340 is decreased as the light transmittance of the photochromic material PCM is decreased under an environment in which the intensity of the incident light is relatively strong. As a result, a contrast ratio of the image displayed on the transparent display panel 300 may be maintained or adjusted to at a proper level under such an environment in which the intensity of the incident light can vary, and thus the quality and the visibility of the image displayed on the transparent display panel 300 may be improved. Further, the light transmittance of the light transmittance adjusting structure 340 may be decreased by a similar rate in all wavelengths reducing distortion of a color of the image displayed on the transparent display panel 300 and a color of the background that a viewer watches through the transparent display panel 300.

As described above, the transparent display panel 300 may effectively improve the quality of the image displayed on the transparent display panel 300 using the light transmittance adjusting structure 340 located over or under the transparent display structure 320. The light transmittance adjusting structure 340 includes the photochromic material PCM of which the light transmittance is changed in response to the intensity of the incident light. As a result, the contrast ratio of the image displayed on the transparent display panel 300 may be maintained or improved because the light transmittance of the light transmittance adjusting structure 340 is decreased as the intensity of the incident light increases. For example, the contrast ratio of the image displayed on the transparent display panel 300 may be maintained at or adjusted because the light transmittance of the light transmittance adjusting structure 340 is increased as the intensity of the incident light decreases. Thus, a transparent display device including the transparent display panel 300 may provide a user with an improved quality image according to the intensity of the incident light.

The photochromic material PCM included in the light transmittance adjusting structure 340 may respond to visible light as well as ultraviolet light. In this case, the transparent display panel 300 may maintain or adjust the contrast ratio of the image displayed on the transparent display panel 300 according to the intensity of the incident light in both an indoor environment and an outdoor environment. Further, since the light transmittance of the photochromic material PCM included in the light transmittance adjusting structure 340 is naturally (or automatically) changed in response to the intensity of the incident light, the transparent display panel 300 may prevent unnecessary power consumption for driving an additional component that adjusts the light transmittance (e.g., a liquid crystal structure included in a conventional transparent display panel). In some example embodiments, the light transmittance adjusting structure 340 may be formed in a film shape or in a liquid form and may be attached (or adhered) to the transparent display structure 320. In this case, the transparent display panel 300 may be manufactured by simply attaching the light transmittance adjusting structure 340 to the transparent display structure 320 while reducing a manufacturing cost of the transparent display panel 300.

Figure 6:
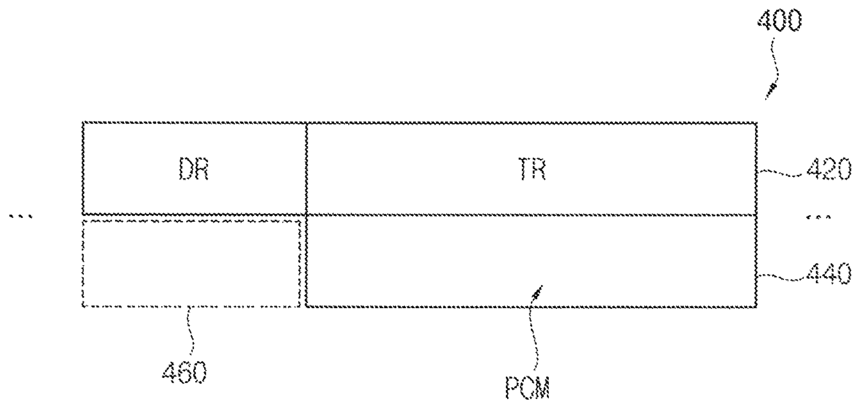
FIG. 6 is a diagram illustrating a transparent display panel, according to example embodiments.

FIG. 6 is a diagram illustrating a transparent display panel, according to example embodiments. The transparent display panel 400 may include a transparent display structure 420 and a light transmittance adjusting structure 440. The transparent display structure 420 may include a display region DR and a transmittance region TR. The light transmittance adjusting structure 440 may include a photochromic material PCM of which light transmittance is changed in response to intensity of incident light. As described above, the light transmittance of the photochromic material PCM may be determined according to a coloring degree of the photochromic material PCM. In this example embodiment, the light transmittance adjusting structure 440 may overlap only the transmittance region TR of the transparent display structure 420, and the light transmittance adjusting structure 440 may not overlap the display region DR of the transparent display structure 420. In the transparent display panel 400, the incident light passes through the transmittance region TR of the transparent display structure 420 in which a transmittance structure corresponding to a transmittance window is formed, and the light transmittance adjusting structure 440 does not overlap the display region DR of the transparent display structure 420. A crack due to an empty space (e.g., a stair gap) may be formed by the light transmittance adjusting structure 440. In some example embodiments, the transparent display panel 400 may further include a buffer structure 460. The buffer structure 460 may be located near the light transmittance adjusting structure 440 to overlap the display region DR of the transparent display structure 420. In this case, the buffer structure 460 fills the empty space formed by the light transmittance adjusting structure 440 preventing a crack that may be formed due to the empty space formed by the light transmittance adjusting structure 440. In an example embodiment, as illustrated in FIG. 6, the light transmittance adjusting structure 440 may be located under the transparent display structure 420. In another example embodiment, the light transmittance adjusting structure 440 may be located over the transparent display structure 420. Since the transparent display panel 400 of FIG. 6 is substantially the same as the transparent display panel 300 of FIG. 4 except that the light transmittance adjusting structure 440 does not overlap the display region DR of the transparent display structure 420, duplicated description related thereto may be omitted.

Figure 7:
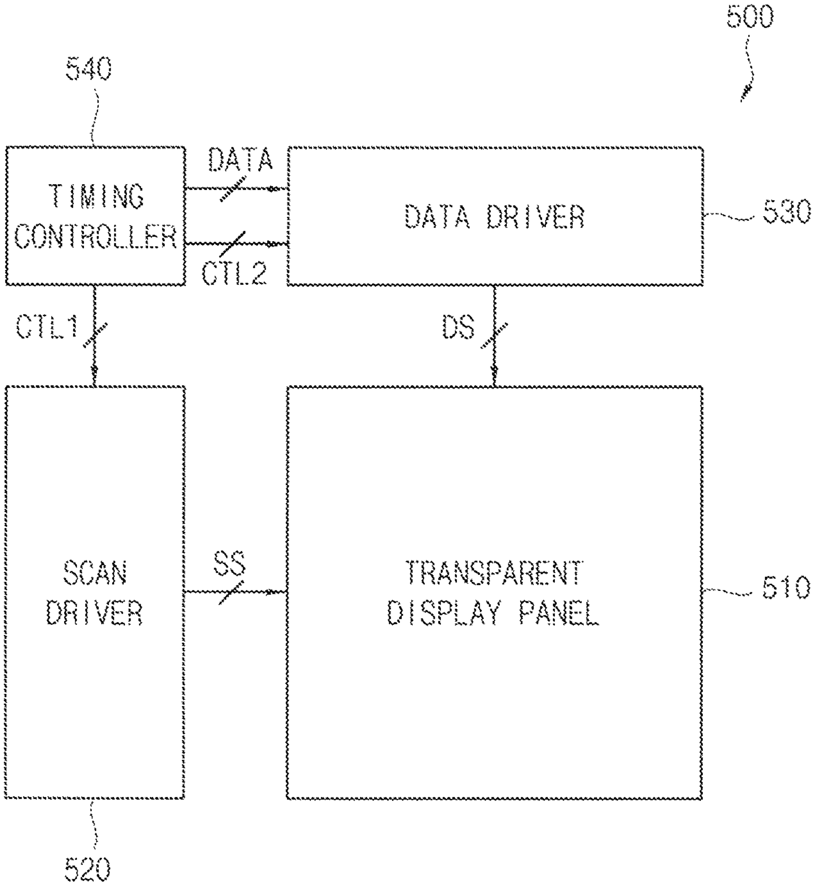
FIG. 7 is a diagram illustrating a transparent display device, according to example embodiments.
Figure 8:
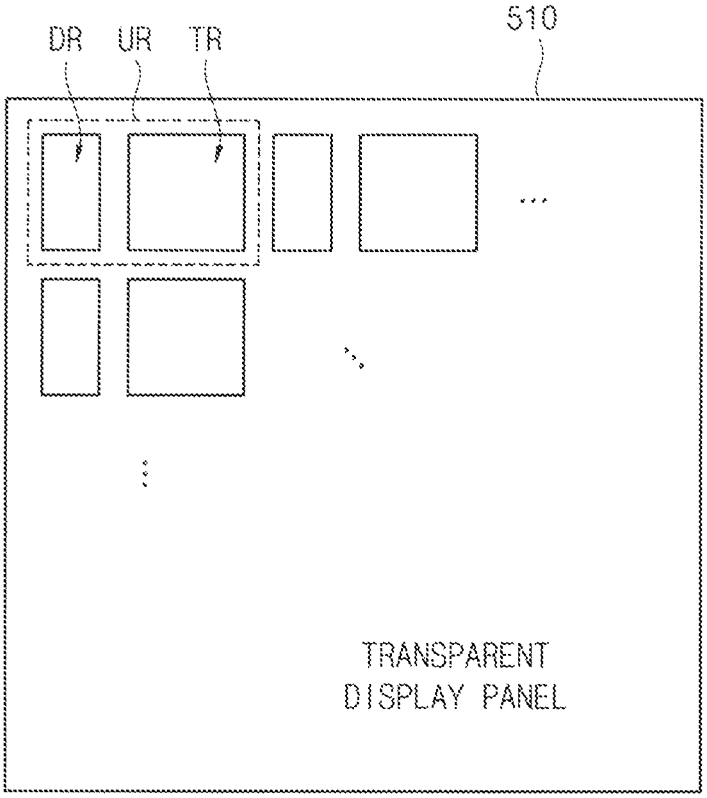
FIG. 8 is a diagram illustrating an example of a transparent display panel included in the transparent display device of FIG. 7.

FIG. 7 is a diagram illustrating a transparent display device, according to example embodiments. FIG. 8 is a diagram illustrating an example of a transparent display panel included in the transparent display device of FIG. 7.

Referring to FIGS. 7 and 8, the transparent display device 500 may include a transparent display panel 510, a scan driver 520, a data driver 530, and a timing controller 540. The transparent display panel 510 may include a plurality of pixels. The transparent display panel 510 may display an image including a text, a figure, and the like. Because the transparent display panel 510 is transparent, the transparent display panel 510 may enable a viewer to watch an object behind the transparent display panel 510 as well as visual information displayed on the transparent display panel 510. As illustrated in FIG. 8, the transparent display panel 510 may include a transparent display structure having a display region DR and a transmittance region TR and a light transmittance adjusting structure located over or under the transparent display structure. For example, one display region DR and one transmittance region TR may constitute one-unit region UR. The transparent display panel 510 may display the image using the transparent display structure and may adjust transparency of the transparent display panel 510 using the light transmittance adjusting structure. The transparency of the transparent display panel 510 may be determined based on light transmittance of the light transmittance adjusting structure. The light transmittance of the light transmittance adjusting structure may be adjusted based on changes of the internal material (e.g., a volume changeable material or a photochromic material) according to the intensity of incident light.

In an example embodiment, the light transmittance adjusting structure may include the volume changeable material of which a volume is changed in response to the intensity of the incident light. The volume changeable material (e.g., a photoisomerization material) may block a passage of the incident light through the light transmittance adjusting structure. For example, the volume changeable material may be polymer containing azobenzene, amorphous spirooxazine, trans-azobenzene, etc. However, the volume changeable material is not limited thereto. As described above, the volume of the volume changeable material may be increased as the intensity of the incident light increases, and the volume of the volume changeable material may be decreased as the intensity of the incident light decreases. Thus, the transparent display panel 510 may maintain or adjust a contrast ratio of the image displayed on the transparent display panel 510 according to the intensity of the incident light.

In another example embodiment, the light transmittance adjusting structure may include the photochromic material of which a coloring degree is changed in response to the intensity of the incident light. The light transmittance of the photochromic material may be determined according to the coloring degree of the photochromic material. The light transmittance of the photochromic material may be decreased as the photochromic material is colored in response to the intensity of the incident light, and the light transmittance of the photochromic material may be increased as the photochromic material becomes transparent in response to the intensity of the incident light. As described above, the light transmittance of the photochromic material may be decreased as the intensity of the incident light increases, and the light transmittance of the photochromic material may be increased as the intensity of the incident light decreases. Thus, the transparent display panel 510 may maintain or adjust the contrast ratio of the image displayed on the transparent display panel 510 according to the intensity of the incident light.

The scan driver 520 may be connected to the transparent display panel 510 via a plurality of scan-lines. Thus, the scan driver 520 may provide a scan signal SS to the transparent display panel 510 via the scan-lines. The data driver 530 may be connected to the transparent display panel 510 via a plurality of data-lines. Thus, the data driver 530 may provide a data signal DS to the transparent display panel 510 via the data-lines. The timing controller 540 may generate control signals CTL1 and CTL2 to control the scan driver 520 and the data driver 530. In some example embodiments, the timing controller 540 may receive image data DATA from an external component, perform a specific processing (e.g., degradation compensation) on the image data DATA, and provide the processed image data DATA to the data driver 530.

Generally, since the incident light directly affects an image displayed on the transparent display panel 510 of the transparent display device 500, the quality and the visibility of the image may be degraded because a contrast ratio of the image is lowered as the intensity of the incident light increases. The transparent display device 500 may include the transparent display panel 510 that includes a light transmittance adjusting structure located over or under a transparent display structure. The light transmittance adjusting structure may include a volume changeable material of which the volume is changed in response to the intensity of the incident light or a photochromic material of which the light transmittance is changed in response to the intensity of the incident light. The transparent display device 500 may effectively improve the quality of the image displayed on the transparent display panel 510 by maintaining or adjusting the contrast ratio of the image displayed on the transparent display panel 510 according to the intensity of the incident light. As a result, the transparent display device 500 may provide a high-quality image to a viewer in an environment where the intensity of the incident light can vary.

In an example embodiment, the transparent display device 500 may be an organic light emitting display device. In this case, the transparent display structure included in the transparent display panel 510 may include an organic light emitting display structure that corresponds to at least one pixel having an organic light emitting diode and a transmittance structure that corresponds to a transmittance window. In another example embodiment, the transparent display device 500 may be a liquid crystal display device. In this case, a transparent display structure included in the transparent display panel 510 may include a liquid crystal display structure that corresponds to at least one pixel having a liquid crystal layer and a transmittance structure that corresponds to a transmittance window. However, the transparent display device 500 is not limited thereto.

Figure 9:
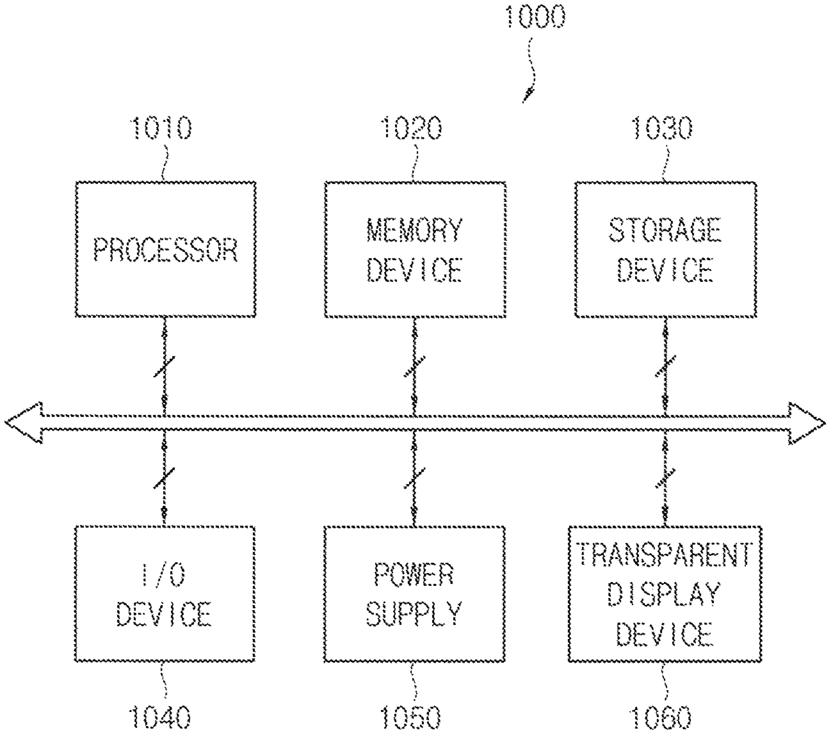
FIG. 9 is a block diagram illustrating an electronic device, according to example embodiments.
Figure 10A:
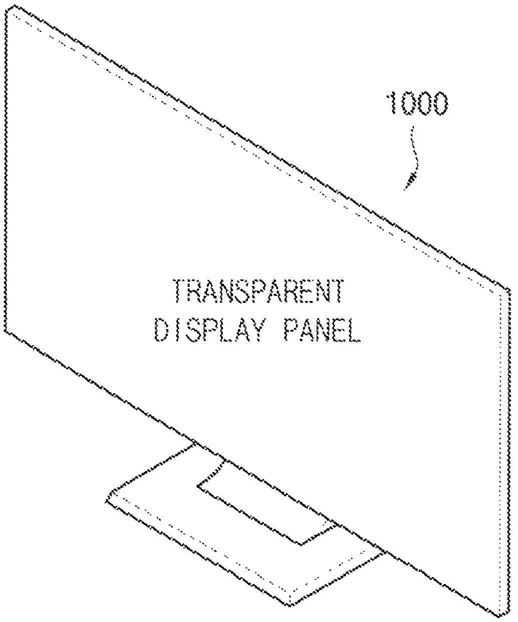
FIG. 10A is a diagram illustrating an example in which the electronic device of FIG. 9 is implemented as a transparent television.
Figure 10B:
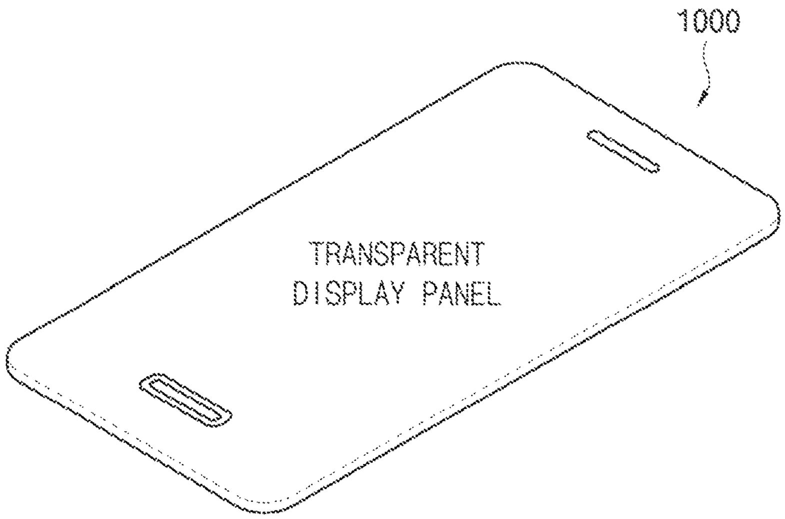
FIG. 10B is a diagram illustrating an example in which the electronic device of FIG. 9 is implemented as a transparent smart phone.

FIG. 9 is a block diagram illustrating an electronic device, according to example embodiments. FIG. 10A is a diagram illustrating an example in which the electronic device of FIG. 9 is implemented as a transparent television. FIG. 10B is a diagram illustrating an example in which the electronic device of FIG. 9 is implemented as a transparent smart phone.

Referring to FIGS. 9 through 10B, the electronic device 1000 may include a processor 1010, a memory device 1020, a storage device 1030, an input/output (I/O) device 1040, a power supply 1050, and a transparent display device 1060. The transparent display device 1060 may be the transparent display device 500 of FIG. 7. In addition, the electronic device 1000 may further include a plurality of ports for communicating with a video card, a sound card, a memory card, a universal serial bus (USB) device, and other electronic devices. In an example embodiment, as illustrated in FIG. 10A, the electronic device 1000 may be implemented as the transparent television. In another example embodiment, as illustrated in FIG. 10B, the electronic device 1000 may be implemented as the transparent smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, and a head mounted display (HMD).

The processor 1010 may perform various computing functions. The processor 1010 may be a micro processor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus. The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, etc. The storage device 1030 may include a solid state drive (SSD) device, a hard disk drive (HDD) device, a CD-ROM device, etc. The I/O device 1040 may include an input device such as a keyboard, a keypad, a touchpad, a touch-screen, a mouse device, etc, and an output device such as a printer, a speaker, etc. The power supply 1050 may provide power for operations of the electronic device 1000.

The transparent display device 1060 may communicate with other components via the buses or other communication links. In some example embodiments, the transparent display device 1060 may be included in the I/O device 1040. As described above, the transparent display device may include a transparent display panel that includes a light transmittance adjusting structure located over or under a transparent display structure. The light transmittance adjusting structure includes a volume changeable material of which a volume is changed in response to intensity of incident light or a photochromic material of which light transmittance is changed in response to the intensity of the incident light. The transparent display device 1060 may effectively improve quality of an image displayed on the transparent display panel by maintaining or adjusting a contrast ratio of the image according to the intensity of the incident light. As a result, the transparent display device 1060 may provide a viewer with an improved quality image in an environment where the intensity of the incident light can vary. The transparent display device 1060 may include the transparent display panel, a scan driver, a data driver, and a timing controller. The transparent display panel may include a transparent display structure having a display region and a transmittance region and a light transmittance adjusting structure located over or under the transparent display structure. The transparent display panel may display the image using the transparent display structure. The scan driver may provide a scan signal to the transparent display panel. The data driver may provide a data signal to the transparent display panel. The timing controller may control the scan driver and the data driver. The light transmittance of the light transmittance adjusting structure may be changed as an internal material of the light transmittance adjusting structure (e.g., the volume changeable material or the photochromic material) is changed in response to the intensity of the incident light. Since the transparent display device 1060 is described above, duplicated description may be omitted.

The present disclosure may be applied to a transparent display device and an electronic device including the transparent display device. For example, the present disclosure may be applied to a cellular phone, a smart phone, a video phone, a smart pad, a smart watch, a tablet PC, a car navigation system, a television, a computer monitor, a laptop, a head mounted display, and the like.

The foregoing is illustrative of example embodiments and is not to be construed as limiting thereof. Although a few example embodiments have been described, those skilled in the art will readily appreciate that other modifications are possible in the example embodiments without materially departing from the novel teachings and advantages of the present disclosure. Accordingly, various modifications are intended to be included within the scope of the present disclosure. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the present disclosure.

What is claimed is:

1. A transparent display panel comprising:

a transparent display structure including a display structure disposed in a display region and a transparent structure disposed in a transmittance region and corresponding to a transparent window; and a light transmittance adjusting structure located over or under the transparent display structure, wherein the light transmittance adjusting structure includes a volume changeable material, and a volume of the volume changeable material is changed in response to intensity of incident light, wherein the incident light passes through the light transmittance adjusting structure and the transparent display structure to allow a viewer to watch an image displayed by the display structure and an object located behind the transparent display panel, and wherein a contrast ratio of the image displayed on the transparent display panel is naturally adjusted by a change of the volume of the volume changeable material in response to the intensity of the incident light.

2. The transparent display panel of claim 1, wherein the volume changeable material blocks a passage of the incident light through the light transmittance adjusting structure.

3. The transparent display panel of claim 2, wherein the volume of the volume changeable material is increased as the intensity of the incident light increases, and wherein the volume of the volume changeable material is decreased as the intensity of the incident light decreases.

4. The transparent display panel of claim 1, wherein the light transmittance adjusting structure overlaps the display region and the transmittance region of the transparent display structure.

5. The transparent display panel of claim 1, wherein the light transmittance adjusting structure overlaps the transmittance region of the transparent display structure, and wherein the light transmittance adjusting structure does not overlap the display region of the transparent display structure.

6. The transparent display panel of claim 5, further comprising:

a buffer structure located near the light transmittance adjusting structure, wherein the buffer structure overlaps the display region of the transparent display structure.

7. The transparent display panel of claim 1, wherein the display structure includes a liquid crystal display structure or an organic light emitting display structure.

8. A transparent display panel comprising:

a transparent display structure including a display structure disposed in a display region and a transparent structure disposed in a transmittance region and corresponding to a transparent window; and a light transmittance adjusting structure located over or under the transparent display structure, wherein the light transmittance adjusting structure includes a photochromic material, and light transmittance of the photochromic material is changed in response to intensity of incident light, wherein the incident light passes through the light transmittance adjusting structure and the transparent display structure to allow a viewer to watch an image displayed by the display structure and an object located behind the transparent display panel, and wherein a contrast ratio of the image displayed on the transparent display panel is naturally adjusted by a change of the light transmittance of the photochromic material in response to the intensity of the incident light.

9. The transparent display panel of claim 8, wherein the light transmittance of the photochromic material is determined according to a coloring degree of the photochromic material.

10. The transparent display panel of claim 9, wherein the light transmittance of the photochromic material is decreased as the intensity of the incident light increases, and wherein the light transmittance of the photochromic material is increased as the intensity of the incident light decreases.

11. The transparent display panel of claim 8, wherein the light transmittance adjusting structure overlaps the display region and the transmittance region of the transparent display structure.

12. The transparent display panel of claim 8, wherein the light transmittance adjusting structure overlaps the transmittance region of the transparent display structure, and wherein the light transmittance adjusting structure does not overlap the display region of the transparent display structure.

13. The transparent display panel of claim 12, further comprising:

a buffer structure located near the light transmittance adjusting structure, wherein the buffer structure overlaps the display region of the transparent display structure.

14. The transparent display panel of claim 8, wherein the display structure includes a liquid crystal display structure or an organic light emitting display structure.

15. A transparent display device comprising:

a transparent display panel including a transparent display structure that includes a display structure disposed in a display region and a transparent structure disposed in a transmittance region and corresponding to a transparent window, and a light transmittance adjusting structure that is located over or under the transparent display structure, the transparent display panel displaying an image using the transparent display structure;

a scan driver configured to provide a scan signal to the transparent display panel;

a data driver configured to provide a data signal to the transparent display panel; and a timing controller configured to control the scan driver and the data driver, wherein light transmittance of the light transmittance adjusting structure is adjusted based on changes of internal material in response to intensity of incident light, wherein the incident light passes through the light transmittance adjusting structure and the transparent display structure to allow a viewer to watch an image displayed by the display structure and an object located behind the transparent display panel, and wherein a contrast ratio of the image displayed on the transparent display panel is naturally adjusted by the changes of the internal material in response to the intensity of the incident light.

16. The transparent display device of claim 15, wherein the light transmittance adjusting structure includes a volume changeable material of which a volume is changed in response to the intensity of the incident light, and wherein the volume changeable material blocks a passage of the incident light through the light transmittance adjusting structure.

17. The transparent display device of claim 16, wherein the volume of the volume changeable material is increased as the intensity of the incident light increases, and wherein the volume of the volume changeable material is decreased as the intensity of the incident light decreases.

18. The transparent display device of claim 15, wherein the light transmittance adjusting structure includes a photochromic material of which a coloring degree is changed in response to the intensity of the incident light, and wherein the light transmittance of the photochromic material is determined according to the coloring degree of the photochromic material.

19. The transparent display device of claim 18, wherein the light transmittance of the photochromic material is decreased as the intensity of the incident light increases, and wherein the light transmittance of the photochromic material is increased as the intensity of the incident light decreases.

20. The transparent display device of claim 15, wherein the display structure includes a liquid crystal display structure or an organic light emitting display structure.

* * * * *